United States Patent [19]

Higgerson et al.

[11] 4,109,773
[45] Aug. 29, 1978

[54] RELEASE BEARING ASSEMBLIES FOR VEHICLE CLUTCHES

[75] Inventors: Raymond Higgerson; David Parsons, both of Leamington Spa, England

[73] Assignee: Automotive Products Limited, Leamington Spa, England

[21] Appl. No.: 742,741

[22] Filed: Nov. 18, 1976

[30] Foreign Application Priority Data

Nov. 21, 1975 [GB] United Kingdom ............... 48017/75
Jan. 27, 1976 [GB] United Kingdom ................. 3122/76

[51] Int. Cl.² .................... F16D 13/75; F16D 13/54
[52] U.S. Cl. .................... 192/111 A; 192/98
[58] Field of Search .................... 192/111 A, 98

[56] References Cited

U.S. PATENT DOCUMENTS

| 3,433,341 | 3/1969 | Bohn et al. | 192/111 A |
| 3,478,853 | 11/1969 | Kraeplin | 192/111 A |
| 3,866,733 | 2/1975 | Linn et al. | 192/111 A |
| 3,868,006 | 2/1975 | Linn et al. | 192/111 A |
| 3,876,049 | 4/1975 | Linn et al. | 192/111 A |
| 3,912,058 | 10/1975 | Parkins | 192/111 A |
| 3,942,617 | 3/1976 | Poon | 192/111 A |

Primary Examiner—John J. Camby
Assistant Examiner—Henry C. Yuen
Attorney, Agent, or Firm—Kemon & Estabrook

[57] ABSTRACT

A release bearing assembly for a vehicle clutch comprising inner and outer relatively slidable sleeves located around the gearbox shaft. The inner sleeve is coupled to the clutch operating lever and the outer sleeve to the release fork of the clutch. The outer sleeve is in a predetermined position when the clutch is engaged and is moved axially away from that position when the clutch is released. An annular member threadably engages the exterior of the inner sleeve and abutment means act on the annular member during clutch release so that the two sleeves move together. Clamping means hold the annular member against rotation during clutch release. Release means release the clamping means when the clutch is re-engaged so that the annular member can rotate about the inner sleeve to allow the inner sleeve to move axially relative to the outer sleeve when it is at the predetermined position to compensate for any wear of the clutch.

15 Claims, 5 Drawing Figures

RELEASE BEARING ASSEMBLIES FOR VEHICLE CLUTCHES

This invention relates to release bearing assemblies for vehicle clutches. The release bearing assemblies are of the type which include relatively slidable inner and outer sleeves, the relative position of the sleeves being adjustable automatically to compensate for any wear of the clutch.

According to the present invention there is provided a release bearing assembly for a vehicle clutch comprising inner and outer relatively slidable sleeves arranged to be located around the shaft of the gearbox of the vehicle, the inner sleeve being operatively connectable with the operating lever of the clutch, the outer sleeve being connectable with the release fork of the clutch and being arranged to assume a predetermined position relative to said gearbox when the clutch is engaged and being movable axially away from said position when the clutch is released, an annular member threadably engaging the exterior of the inner sleeve, abutment means carried by said outer sleeve and arranged in use to act on said annular member so that said inner sleeve moves axially with the outer sleeve when the clutch is released, clamping means arranged to engage said annular member to hold said member against rotation when the sleeves are moved axially during clutch release, and means for releasing the clamping means from engagement with said annular member as said outer sleeve approaches the predetermined position under the influence of the operating lever of the clutch so that the annular member can rotate about the inner sleeve to allow the inner sleeve to move axially relative to the outer sleeve when the outer sleeve is in its predetermined position.

The annular member may be a nut of circular cross-section, at least a portion of the wall of the nut in axial section being of frusto-conical form, and said clamping means may comprise a ring disposed around said frusto-conical portion. The ring may have a radially extending portion and a frusto-conical portion the shape of which conforms substantially with the exterior of the frusto-conical portion of the nut. The radially extending portion may have a projection which extends through a longitudinal slot in the outer sleeve.

The release bearing assembly may include a needle thrust bearing disposed between the abutment means and the annular member. The release bearing assembly may include bias means tending to urge said clamping means towards a position in which it engages said annular member. The bias means may be a spring.

The abutment means may comprise a circlip carried by the outer sleeve. Alternatively the abutment means may comprise an inwardly extending annular flange formed integrally with said outer sleeve.

The release means may be constituted by an end face of a slot formed in a leg member which depends from the cover of the clutch, the slot accommodating the projection on said clamping ring. Alternatively the release means may comprise an annular flange formed on a tubular portion which projects from the gearbox of the vehicle.

The annular member may be a nut of circular cross-section, at least a portion of the wall of the nut in axial section being of frusto-conical form, and said clamping means may comprise a further annular member carried by the outer sleeve, an inner peripheral portion of the further annular member having a cut away part corresponding in shape to and accommodating said frusto-conical portion of the nut. The further annular member may comprise said abutment means.

The further annular member may have one or more slots the or each of which accommodates a radially inwardly projecting finger on a plate carried by the clutch cover, the or each finger forming a stop for the outer sleeve.

The nut may carry a ball bearing arrangement comprising inner and outer races and a plurality of balls therebetween, said outer race being arranged to abut said finger or fingers when the clutch is engaged, said fingers constituting said release means.

The invention will be described now by way of example only with particular reference to the accompanying drawings. In the drawings.

Figure 1:
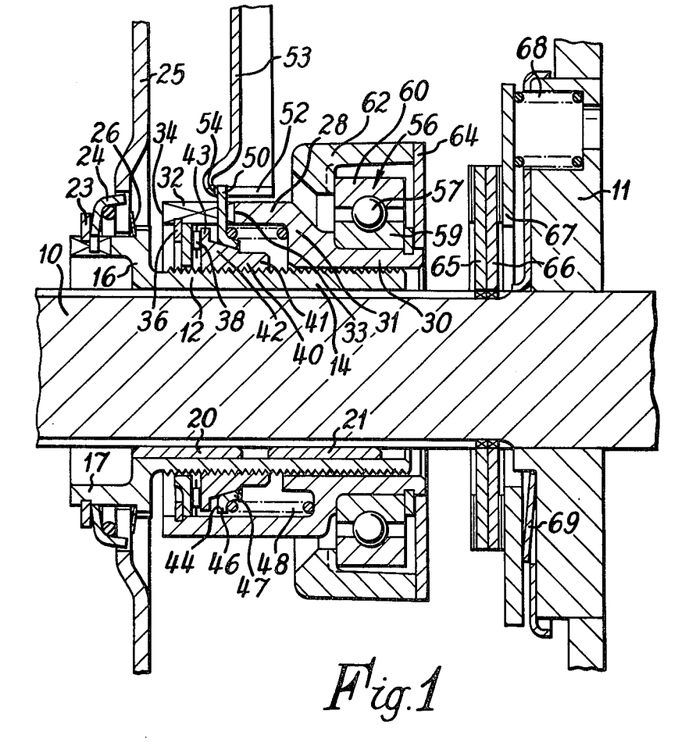
FIG. 1 is a section through one embodiment of a release bearing assembly in accordance with the present invention.

Referring to FIG. 1 of the drawings a clutch release bearing assembly is located around the input drive shaft 10 of a gearbox 11. The release bearing assembly has a first sleeve 12 which consists of a first tubular portion 14, a radially outwardly extending step portion 16 at one end of the tubular portion 14, and a second tubular portion 17 extending coaxially with the first portion 14 from the step portion 16. The longitudinal extent of the first tubular portion 14 is substantially greater than the longitudinal extent of the second tubular portion 17. The outer periphery of the first tubular portion 14 is threaded. In one arrangement shown in the upper part of FIG. 1 the first tubular portion 14 is mounted directly on the shaft 10 whilst in an alternative arrangement shown in the lower part of FIG. 1 the tubular portion 14 is mounted on the shaft 10 by means of two annular bearing bushes 20 and 21 which are a push-fit on the inner periphery of the tubular portion 14. The bushes 20 and 21 allow the sleeve 12 to rotate and to be slid axially relative to the shaft 10.

The second tubular portion 17 of the sleeve 12 carries a circlip 23 which acts as a retainer for an annular clip 24 which engages a recess in the diaphragm spring 25 of the clutch. A small Belleville spring 26 is disposed on the opposite side of the diaphragm spring 25 between the spring 25 and an annular flange formed by the radially outer part of the step portion 16.

An outer second sleeve 28 is arranged coaxially with the sleeve 12. The sleeve 28 has a first tubular portion 30 which extends from one end of the sleeve 12 adjacent the gearbox 11 towards the clutch of the vehicle; a step portion 31 extending radially outwardly from the first tubular portion 30 and a second tubular portion 32 extending from a radially outer portion of the step portion towards the clutch of the vehicle. The first tubular portion 30 is mounted on the first tubular portion 14, the diameter of the tubular portion 30 being such that the sleeve 28 can slide axially upon the threaded surface of the tubular portion 14. The second tubular portion 32 has a longitudinal slot 33 formed therein, the slot 33 extending from the end 34 of the portion 32 closest to the clutch to a position substantially halfway along the axial extent of the portion 32. A circlip 36 is carried adjacent the end 34 of the portion 32, the circlip 36 constituting a retainer for a needle thrust bearing 38 which is disposed between the circlip 36 and a nut 40 which engages the threaded surface of the tubular portion 14. The nut 40 has a first cylindrical portion 41, a frusto-conical second portion 42 extending coaxially from the cylindrical portion 41 towards the clutch, and an annular flange 43 disposed in juxtaposition with the needle thrust bearing 38.

A clamping ring 44 is disposed coaxially around the frusto-conical portion 42 of the nut 40. The ring 44 has a radial portion 46 and a frusto-conical portion 47, the shape of which conforms substantially with the shape of the frusto-conical portion 42 of the nut 40. The ring 44 is biased towards the clutch of the vehicle by a spring 48 which extends between the step portion 31 and the ring 44. The ring 44 has a radial projection 50 which extends through the slot 33 in the portion 32 of the sleeve 28 and into a slot 52 formed in a leg 53 which depends from the cover of the clutch. The end face 54 of the slot 52 defines a stop to limit movement of the ring 44 towards the clutch.

The portion 30 of the sleeve 28 carries a ball bearing assembly 56. The ball bearing assembly has a plurality of balls 57 which are disposed between an inner race 59 and an outer race 60. The ball bearing assembly 56 carries a housing 62 which is coupled to the release fork of the clutch so that when the driver of the vehicle depresses the clutch pedal to release the clutch, the housing 62, ball bearing assembly 56 and the sleeve 28 are moved axially along the shaft 10 towards the gearbox 11. The housing 62 carries an annular brake abutment plate 64 which is disposed adjacent the end of the sleeve 28.

A series of brake plates 65, 66 and 67 are mounted coaxially with the shaft 10 at the front of the gearbox 11. The plate 67 is fixed relative to the gearbox housing 11 while the plates 65 and 66 can rotate with the shaft 10. As shown in the upper part of FIG. 1 a coil spring 68 is disposed between the rear brake plate 67 and the gearbox 11. In an alternative arrangement shown in the lower part of FIG. 1 a Belleville spring 69 is disposed between the rear brake plate 67 and the gearbox 11.

In use if the clutch is engaged the components are in the position shown in FIG. 1. When the driver of the vehicle depresses the clutch pedal a thrust is applied to the outer sleeve 28 tending to move the sleeve 28 towards the gearbox 11. The movement of the outer sleeve 28 is transferred to the inner sleeve 12 by the circlip 36, thrust bearing 38 and nut 40. As the sleeve 12 moves towards the gearbox 11 the ring 44 becomes clamped against the frusto-conical portion 42 to prevent relative rotation between the sleeve 12 and the nut 40. If the clutch pedal of the vehicle is depressed sufficiently the brake abutment plate 64 contacts the front brake plate 65 so that rotation of the shaft 10 is retarded.

When the driver of the vehicle allows the clutch pedal to rise for clutch re-engagement, the thrust which was applied to the sleeve 28 is relieved. The resilience of the diaphragm spring 25 causes the inner sleeve 12 to move towards the clutch and this movement is also transmitted to the outer sleeve 28 by way of the nut 40, thrust bearing 38 and circlip 36. The two sleeves 12 and 28 continue to move towards the clutch until the sleeve 28 reaches a stop provided by the release fork of the clutch. The clamping ring 44 moves with the inner sleeve 12 until it contacts the face 54 at which point its clamping action of the nut 40 ceases. The nut 40 is prevented from axial movement towards the clutch by the thrust bearing 38. The nut 40 can, however, rotate about the sleeve 12 to allow the sleeve 12 to move towards the clutch and enable the friction elements of the clutch to re-engage.

Thus it will be seen that if the friction elements of the clutch become worn the inner sleeve 12 can automatically assume a different position relative to the outer sleeve 28 to compensate for such wear.

Figure 2:
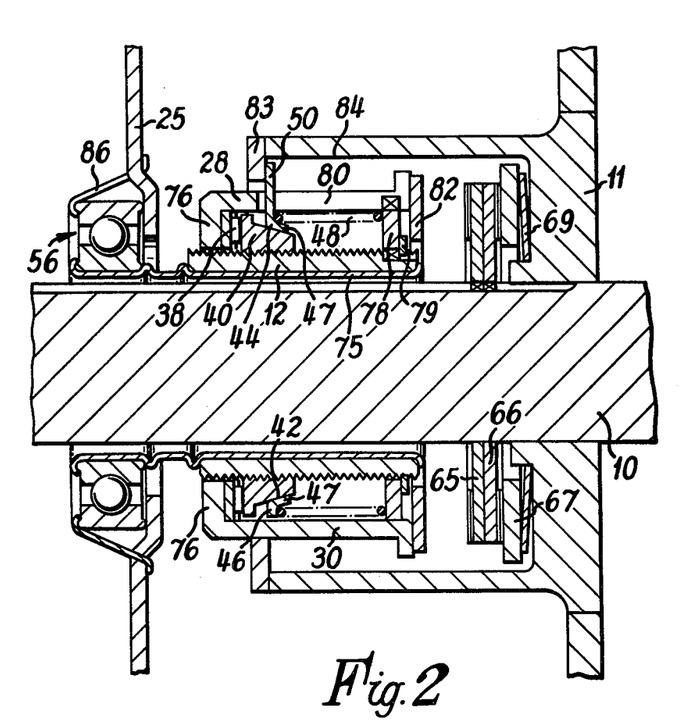
FIG. 2 is a section through another embodiment of a release bearing assembly in accordance with the present invention.

Referring to FIG. 2 of the drawings which shows a second embodiment of a release bearing assembly in which the components similar to those of the embodiment of FIG. 1 are indicated by like reference numerals. In this embodiment the inner sleeve 12 has a singular tubular portion the outer surface of which is threaded. The sleeve 12 is mounted on a crimped tube 75 which is mounted coaxially with the shaft 10 of the gearbox 11. The outer sleeve 28 has a tubular portion 30 and an inwardly extending annular flange 76 at its end closest to the clutch, the flange forming a retainer for the needle thrust bearing 38 disposed between the flange and the nut 40. The spring 48 which biases the clamping ring 44 towards the clutch extends between the clamping ring and a pin 78 which extends radially between the two sleeves 12 and 28 to key the two sleeves together to prevent relative rotation thereof. The pin 78 is held in position by a circlip 79 carried by the sleeve 12. In this embodiment the outer sleeve has a slot 80 which extends from a position adjacent the nut 40 to the end of the sleeve adjacent the gearbox 11. The end of the sleeve 28 adjacent the gearbox 11 carries a brake abutment plate 82. The stop for the clamping ring 44 is provided in this case by an annular flange 83 formed on a cylindrical tube 84 which is formed integrally with the gearbox housing 11.

The ball bearing assembly 56 in this embodiment is mounted on the crimped tube 75 and is secured to the diaphragm spring 25 by a clip 86.

In use if the clutch is engaged the components are in the position shown in FIG. 2. When the driver of the vehicle depresses the clutch pedal a thrust is applied to the outer sleeve 28 tending to move the sleeve 28 towards the gearbox 11. The movement of the outer sleeve 28 is transferred to the inner sleeve 12 by the flange 76, thrust bearing 38 and nut 40. As the sleeve 12 moves towards the gearbox 11 the ring 44 becomes clamped against the frusto-conical portion 42 to prevent relative rotation between the sleeve 12 and the nut 40. If the clutch pedal of the vehicle is depressed sufficiently the brake abutment plate 82 contacts the front brake plate 65 so that rotation of the shaft 10 is retarded.

When the driver of the vehicle allows the clutch pedal to rise for clutch re-engagement, the thrust which was applied to the sleeve 28 is relieved. The resilience of the diaphragm spring 25 causes the inner sleeve 12 to move towards the clutch and this movement is also transmitted to the outer sleeve 28 by way of the nut 40, thrust bearing 38 and flange 76. The two sleeves 12 and 28 continue to move towards the clutch until the sleeve 28 reaches a stop provided by the release fork of the clutch. The clamping ring 44 moves with the inner sleeve 12 until it contacts the flange 83 at which point its clamping action on the nut 40 ceases. The nut 40 is prevented from axial movement towards the clutch by the thrust bearing 38. The nut 40 can, however, rotate about the sleeve 12 to allow the sleeve 12 to move towards the clutch and enable the friction elements of the clutch to re-engage.

Thus it will be seen that if the friction elements of the clutch become worn the inner sleeve 12 can automatically assume a different position relative to the outer sleeve 28 to compensate for such wear.

Figure 3:
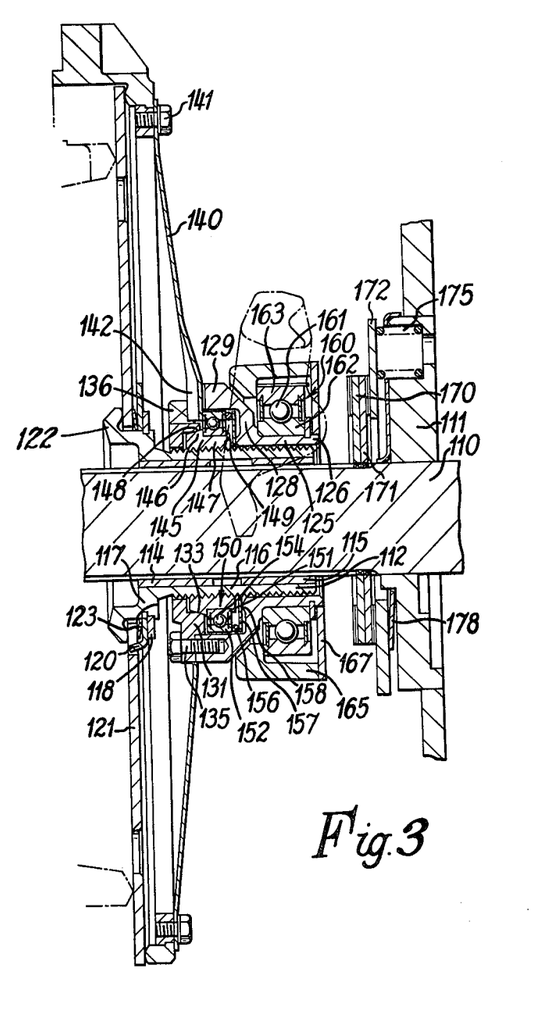
FIG. 3 is a section through another embodiment of a release bearing assembly in accordance with the present invention.
Figure 4:
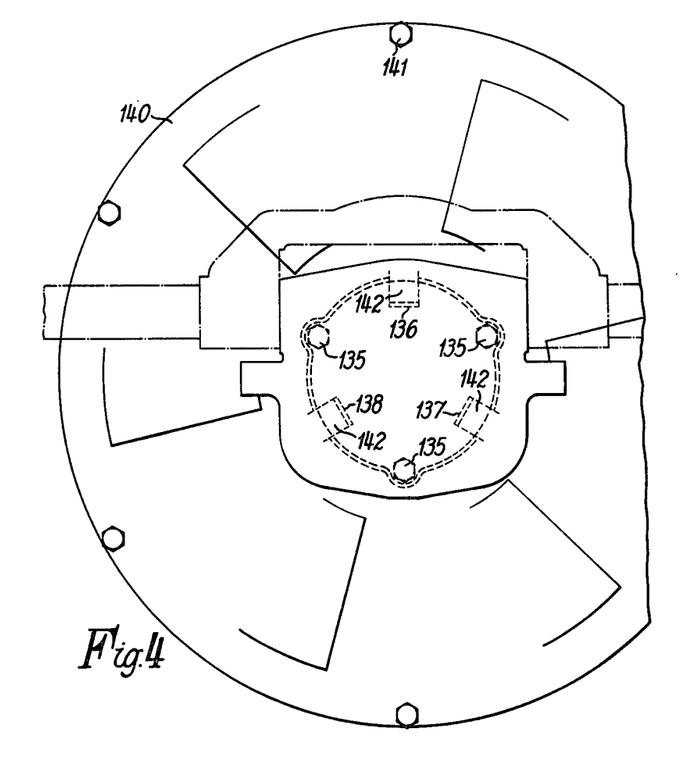
FIG. 4 is a view of part of the assembly of FIG. 3.

In the embodiment shown in FIG. 3 of the drawings a clutch release bearing assembly is located around the input drive shaft 110 of a gearbox 111. The release bearing assembly has an inner first sleeve 112 which is mounted on the shaft 110 by means of two annular bearing bushes 114, 115 which are a press-fit on the inner surface of the sleeve 112. The sleeve 112 has a tubular portion 116 extending along a substantial portion of the length of the sleeve, and a stepped portion 117 at the end of the tubular portion 116 remote from the gearbox 111. The outer periphery of the tubular portion 116 is threaded.

The stepped portion 117 of the sleeve 112 carries a circlip 118 which acts as a retainer for an annular clip 120 which engages a recess in the diaphragm spring 121 of the clutch. The radially inner edge portion of the spring 121 is held against a radially extending portion 122 of the stepped portion 117 by the clip 120. A small Belleville spring 123 is disposed between the diaphragm spring 121 and the clip 120.

An outer second sleeve 125 is arranged coaxially with the sleeve 112. The sleeve 125 has a first tubular portion 126 which extends from one end of the sleeve 112 adjacent the gearbox 111 towards the clutch of the vehicle; a step portion 128 extending generally radially outwardly from the first tubular portion 126, and a second tubular portion 129 extending from a radially outer portion of the step portion towards the clutch of the vehicle. The diameter of the inner periphery of the second tubular portion 129 is greater than the outer diameter of the tubular portion of the inner sleeve 112 so that an annular space is provided therebetween. The first tubular portion 126 is mounted on the tubular portion 116 of the sleeve 112, the diameter of the tubular portion 126 being such that the sleeve 125 can slide axially on the threaded surface of the tubular portion 116.

An annular member 131 is fixed to the end of the second tubular portion 129. A radially inner part of the annular member is cut away to define a surface 133 which is inclined to the axis of the shaft 110. The annular member 131 is secured to the tubular part 129 by means of three equi-angularly spaced fixing bolts 135 which engage in threaded apertures in the tubular part 129. The annular member has three equi-angularly spaced slots 136, 137, 138 in its outer periphery, each slot accommodating a radially inwardly projecting finger 142 formed on a dished-plate 140. The dished-plate 140 is secured to the cover of the clutch by means of bolts 141.

A nut 145 is disposed intermediate the tubular portion 116 and the second tubular portion 129. The nut engages the threaded periphery of the tubular portion 116. The nut has a frusto-conical portion 146, and a tubular portion 147 extending from the frusto-conical portion 146 towards the gearbox of the vehicle. The frusto-conical portion 146 is disposed in and has a shape corresponding to the cut away portion of the annular member 131 whereby the outer peripheral surface 148 of the frusto-conical portion can engage the inclined surface 133 on the annular member 131. The tubular portion 147 carries a bearing arrangement 150 which consists of an inner race 151 mounted on the tubular portion 147, an outer race 152 and a series of circumferentially spaced balls 154 in between the two races 151 and 152. The inner race 151 is held between the frusto-conical portion 146 and a flange 149 on the end of the tubular portion 147. A ring 156 is disposed intermediate the outer race and a Belleville spring 157 disposed adjacent the step portion 128 of the sleeve 125. The Belleville spring 157 is disposed in contact with an annular ridge 158 formed on the step portion 128. The Belleville spring 157 is provided to urge the surface 148 of the frusto-conical portion 146 into contact with the inclined surface 133 of the annular member 131. As shown in the upper part of FIG. 3 the outer race 152 can contact the fingers 142 on the dished-plate 140.

The portion 126 of the sleeve 125 carries a ball bearing assembly 160. The ball bearing assembly has a plurality of balls 161 which are disposed between an inner race 162 and an outer race 163. The ball bearing assembly 160 carries a housing 165 which is coupled to the release fork of the clutch so that when the driver of the vehicle depresses the clutch pedal to release the clutch the housing 165, the ball bearing assembly 160 and the sleeve 125 are moved axially along the shaft 110 towards the gearbox 111. The housing 165 carries an annular brake abutment plate 167 which is disposed adjacent the end of the sleeve 125.

A series of brake plates 170, 171, 172 are mounted coaxially with the shaft 110 at the front of the gearbox 111. The plate 172 is fixed relative to the gearbox housing 111 whilst the plates 170 and 171 can rotate with the shaft 110. As shown in the upper part of FIG. 3 a coil spring 175 is disposed between the rear brake plate 172 and the gearbox 111. In an alternative arrangement shown in the lower part of FIG. 3 a Belleville spring 178 is disposed between the rear brake plate 172 and the gearbox 111.

In use if the clutch is engaged the components are in the position shown in FIG. 3. When the driver of the vehicle depresses the clutch pedal a thrust is applied to the outer sleeve 125 tending to move the sleeve 125 towards the gearbox 111. The movement of the outer sleeve 125 is transferred to the inner sleeve 112 through the annular member 131 and the nut 145. As the sleeve 125 moves towards the gearbox 111 the inclined surface 133 on the annular member 131 engages the frusto-conical part 146 of the nut so that the annular member 131 and nut 145 become wedged together. The wedging action is assisted by the Belleville spring 157. In this condition no relative rotation of the nut 145 and the sleeve 112 can occur. If the clutch pedal of the vehicle is depressed sufficiently the brake abutment plate 167 contacts the front brake plate 170 so that rotation of the shaft 110 is retarded.

When the driver of the vehicle allows the clutch pedal to rise for clutch re-engagement, the thrust which was applied to the sleeve 125 is relieved. The resilience of the diaphragm spring 121 causes the inner sleeve 112 to move towards the clutch and this movement is also transmitted to the outer sleeve 125 by way of the nut 145, and annular member 131. The two sleeves 112 and 125 continue to move towards the clutch until the outer race 152 of the bearing arrangement 150 comes into contact with the stop provided by the inwardly directed fingers 142 on the dished-plate 140. No further axial movement of the nut 145 relative to the shaft 110 can then occur. Return springs (not shown) extend between the bearing assembly 160 and the gearbox 111. The return springs are fixed to both sides of the bearing assembly 160 and are provided to push the bearing assembly 160 away from the gearbox 111. The second tubular portion 129 of the sleeve 125, which at this stage can move a small distance before contacting the dished-plate 140, is then moved by the action of the return springs so that the inclined surface 133 on the annular member can move out of engagement with the frusto-conical portion 146 of the nut 145. This allows the nut 145 to rotate about the inner sleeve 112 to allow the sleeve 112 to move towards the clutch so that the friction elements of the clutch can re-engage.

Thus it will be seen that if the friction elements of the clutch become worn the inner sleeve 112 can automatically assume a different position relative to the outer sleeve 125 to compensate for any such wear of the friction elements.

Figure 5:
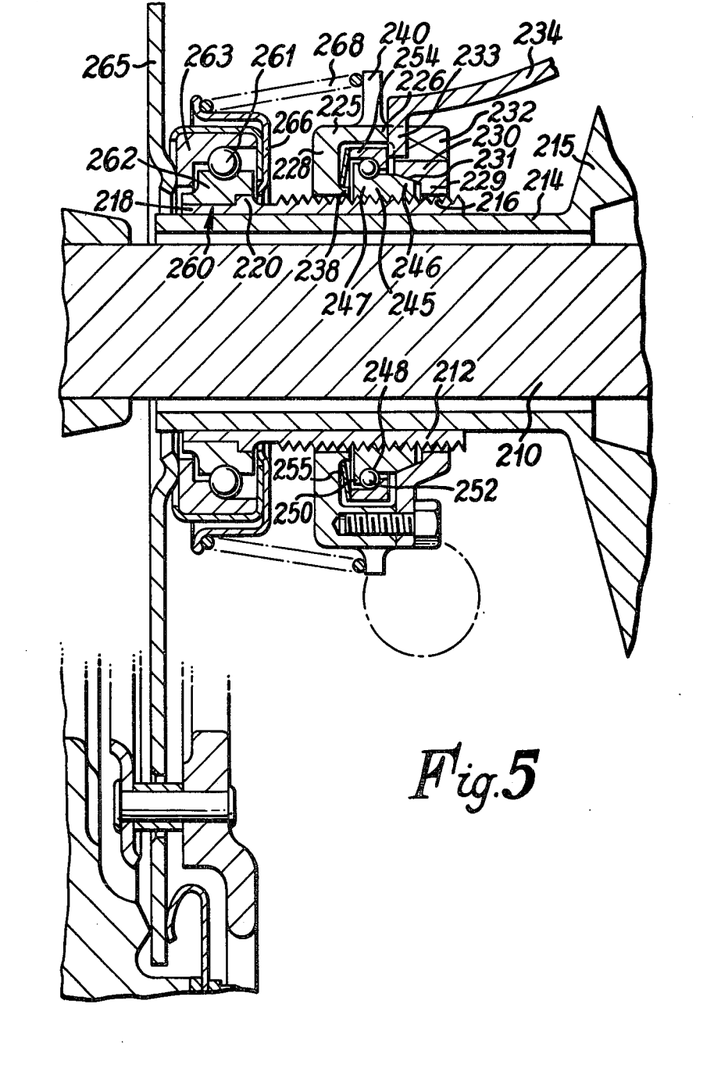
FIG. 5 is a section through a further embodiment of a release bearing assembly in accordance with the present invention.

In the embodiments described above a pulling action is exerted on the outer sleeve in order to release the clutch. FIG. 5 shows a release bearing assembly in which a pushing action is exerted on the outer sleeve to release the clutch.

In the embodiment shown in FIG. 5 a clutch release bearing assembly is located around the input drive shaft 210 of a gearbox. The release bearing assembly has an inner first sleeve 212 which is mounted on a tubular portion 214 which is formed integrally with the gearbox housing 215. The tubular portion 214 is disposed coaxially around the shaft 210.

A substantial portion of the outer periphery of the sleeve 212 is threaded as shown at 216. The remainder of the sleeve which is closest to the clutch has a wall part 218 and an annular flange 220 which is formed at the junction of the threaded part 216 and the wall part 218.

An outer second sleeve 225 is arranged coaxially with the sleeve 212 so that it can slide axially relative to the sleeve 212. The second sleeve 225 has a tubular portion 226 which is spaced radially from the first sleeve 215 and two radially inwardly projecting portions 228, 229, one at each end of the tubular portion 226. Each radially inwardly projecting portion 228, 229 terminates adjacent the periphery of the threaded portion 216 of the sleeve 215. The portion 229 which is remote from the clutch of the vehicle has a step 230 formed on its internal surface. The step 230 defines a surface 231 which is inclined to the axis of the shaft 210 so that it diverges towards the clutch. A radially outer part of the portion 229 has a slot 232 which accommodates a finger 233 formed on an arm 234 which extends from and is attached to the gearbox (not shown).

The portion 228 which is closest to the clutch has a circumferentially extending lip 238 formed at the inner extremety of its interior wall.

The outer wall part of the tubular portion 226 carries a radially outwardly projecting annular flange 240.

The sleeve 225 is attached to the release fork of the clutch of the vehicle. When the clutch pedal of the vehicle is depressed the sleeve 225 is pushed towards the clutch.

A nut 245 is disposed in the space between the threaded portion 216 and the tubular portion 226 and engages the threaded portion 216. The nut 245 has a frusto-conical portion 246, a tubular portion 247 extending from the frusto-conical portion towards the clutch, the tubular portion 247 having a circumferential groove 248 at its junction with an annular flange 250 formed on the nut. The frusto-conical portion 246 has a shape corresponding to the space defined between the surface 231 and the sleeve 212 whereby the surface of the frusto-conical portion 246 can engage the surface 231.

The surface of the groove 248 forms an inner race for a plurality of balls 252 disposed circumferentially around the groove between the nut 245 and an outer ball race 254. A Belleville spring 255 is disposed against the outer race 254 and retained in position by the lip 238. The outer race 254 is in engagement with the finger 233 which acts as a stop to limit axial movement of the nut 245 towards the gearbox.

The sleeve portion 218 carries a ball bearing assembly 260. The ball bearing assembly has a plurality of balls 261 which are disposed between an inner race 262 and an outer race 263. The inner race 262 engages the flange 220 and the outer race engages a radially inner portion of a diaphragm spring 265 of the clutch. The inner race 262 carries a bracket 266 which acts as a retainer for a spring 268 extending between the bracket and the flange 240.

In use if the clutch is engaged the components are in the position shown in FIG. 5. When the driver of the vehicle depresses the clutch pedal a thrust is applied to the outer sleeve 225 tending to move the sleeve towards the clutch. The movement of the outer sleeve is transmitted to the inner sleeve 212 through the nut 245. As the sleeve 225 moves towards the clutch the inclined surface 231 engages the frusto-conical part 246 so that the sleeve 225 and nut 245 become wedged together. In this condition no relative rotation of the nut 245 and sleeve 212 can occur.

When the driver of the vehicle allows the clutch pedal to rise for clutch re-engagement, the thrust which was applied to the sleeve 225 is relieved. The resilience of the diaphragm spring 265 causes the inner sleeve 212 to move toward the gearbox and this movement is transmitted to the outer sleeve 225 by way of the nut 245. The two sleeves 212 and 225 continue to move towards the gearbox until the outer race 254 comes into contact with the finger 233. No further axial movement of the nut 245 relative to the shaft 210 can then occur. The sleeve 225 can move a small distance toward the gearbox before it engages the stop 233 under the action of the spring 268. This releases the surface 231 and the frusto-conical part 246 from their wedged condition thereby allowing the nut 245 to rotate about the inner sleeve 212 so that the sleeve 212 can move towards the gearbox and the friction elements of the clutch can re-engage.

Thus it will be seen that if the friction elements of the clutch become worn the inner sleeve 212 can automatically assume a different position relative to the outer sleeve 225 to compensate for such wear.

We claim:

1. In a vehicle clutch release mechanism comprising a clutch operating lever and a clutch release fork, a release bearing assembly comprising inner and outer sleeves arranged to slide axially relative to each other and located around the shaft of the gear box of the vehicle, the inner sleeve being operatively connectable with the operating lever of the clutch, the outer sleeve being connectable with the release fork of the clutch and being arranged to assume a predetermined position relative to said gear box when the clutch is engaged and being movable axially away from said position when the clutch is released, a nut threadably engaging the exterior of the inner sleeve, abutment means carried by said outer sleeve and arranged in use to act on said nut so that said inner sleeve moves axially with the outer sleeve when the clutch is released, clamping means arranged to engage said nut to hold said nut against rotation when the sleeves are moved axially during clutch release, and release means for releasing the clamping means from engagement with said nut as said outer sleeve approaches the predetermined position under the influence of the operating lever of the clutch, so that the nut can rotate, under the influence of an axially force derived from the operating lever, about the inner sleeve to allow the inner sleeve to move axially relative to the outer sleeve when the outer sleeve is in its predetermined position.

2. In a vehicle clutch release mechanism as claimed in claim 1 wherein at least a portion of the wall of the nut in axially section is a frusto-conical form, and said clamping means comprises an annular member, an inner peripheral portion of the annular member having a cut away part corresponding in shape to and accomodating said frusto-conical portion of the nut.

3. In a vehicle clutch release mechanism as claimed in claim 2 wherein said annular member comprises said abutment means.

4. In a vehicle clutch release mechanism as claimed in claim 2 wherein said annular member has a plurality of slots, each slot accomodating a radially inwardly projecting finger on a plate carried by the cover of the clutch, each finger forming a stop for the outer sleeve.

5. In a vehicle clutch release mechanism as claimed in claim 4 wherein the nut carries a ball bearing arrangement comprising inner and outer races and a plurality of balls, therebetween, said outer race being arranged to abut said finger or fingers when the clutch is engaged, said fingers constituting said release means.

6. In a vehicle clutch release mechanism as claimed in claim 1 wherein said nut is of circular crosssection, at least a portion of the wall of the nut in axial section being of frusto-conical form, and said clamping means comprises a ring disposed around said frusto-conical portion.

7. In a vehicle clutch release mechanism as claimed in claim 6 wherein said ring has a radially extending portion and a frusto-conical portion the shape of which conforms substantially with the exterior of the frusto-conical portion of the nut.

8. In a vehicle clutch release mechanism as claimed in claim 7 wherein the radially extending portion has a projection which extends through a longitudinal slot in the outer sleeve.

9. In a vehicle clutch release mechanism as claimed in claim 8, wherein said release means comprises the end face of a slot formed in a leg member which depends from the cover of the clutch, the slot accommodating the projection on the clamping ring.

10. In a vehicle clutch release mechanism as claimed in claim 1 including a needle thrust bearing disposed between the abutment means and the nut.

11. In a vehicle clutch release mechanism as claimed in claim 1 including bias means tending to urge said clamping means towards a position in which it engages said nut.

12. In a vehicle clutch release mechanism as claimed in claim 11 wherein said bias means is a spring.

13. In a vehicle clutch release mechanism as claimed in claim 1 wherein said abutment means comprises a circlip carried by the outer sleeve.

14. In a vehicle clutch release mechanism as claimed in claim 1 wherein said abutment means comprises an inwardly extending flange formed integally with said outer sleeve.

15. In a vehicle clutch release mechanism as claimed in claim 1 wherein the release means comprises an annular flange formed on a tubular portion which projects from the gearbox of the vehicle.

* * * * *